US009554353B2

United States Patent
Jose et al.

(10) Patent No.: US 9,554,353 B2
(45) Date of Patent: Jan. 24, 2017

(54) LOCATION BASED USE OF THE DSRC SPECTRUM

(71) Applicant: QUALCOMM Incorporated, San Diego, CA (US)

(72) Inventors: Jubin Jose, Bound Brook, NJ (US); Ying Wang, Easton, PA (US); Junyi Li, Chester, NJ (US); Sundar Subramanian, Somerville, NJ (US); Xinzhou Wu, Monmouth Junction, NJ (US)

(73) Assignee: QUALCOMM Incorporated, San Diego, CA (US)

(*) Notice: Subject to any disclaimer, the term of this patent is extended or adjusted under 35 U.S.C. 154(b) by 668 days.

(21) Appl. No.: 13/889,089

(22) Filed: May 7, 2013

(65) Prior Publication Data

US 2014/0335884 A1 Nov. 13, 2014

(51) Int. Cl.
| | |
|---|---|
| *H04W 24/00* | (2009.01) |
| *H04W 64/00* | (2009.01) |
| *H04W 88/06* | (2009.01) |
| *G01S 5/00* | (2006.01) |
| *H04L 1/00* | (2006.01) |

(Continued)

(52) U.S. Cl.
CPC .............. *H04W 64/00* (2013.01); *G01S 5/00* (2013.01); *G01S 5/0263* (2013.01); *G01S 19/11* (2013.01); *G01S 19/48* (2013.01); *H04L 1/00* (2013.01); *H04W 88/06* (2013.01); *H04W 72/00* (2013.01)

(58) Field of Classification Search
None
See application file for complete search history.

(56) References Cited

U.S. PATENT DOCUMENTS

| | | | |
|---|---|---|---|
| 8,023,939 | B2 | 9/2011 | Good et al. |
| 8,274,405 | B2 | 9/2012 | Bos |

(Continued)

FOREIGN PATENT DOCUMENTS

| | | |
|---|---|---|
| JP | 2010233007 A | 10/2010 |
| WO | 2012012836 A1 | 2/2012 |
| WO | WO-2012117320 A1 | 9/2012 |

OTHER PUBLICATIONS

ISA/EPO, International Search Report and Written Opinion of the International Searching Authority, Int'l App. No. PCT/US2014/035646, Oct. 13, 2014, European Patent Office, Rijswijk, NL, 15 pgs.

(Continued)

*Primary Examiner* — Charles Appiah
*Assistant Examiner* — Alexander Yi
(74) *Attorney, Agent, or Firm* — Holland & Hart LLP

(57) ABSTRACT

Methods, systems, and devices are described for using location information to determine whether to use at least a portion of a dedicated short range communications (DSRC) spectrum. Current location information of a multi-mode device is determined. The multi-mode device is operating outside of the DSRC spectrum. The current location information is used to determine whether the multi-mode device is located outside of geographical region attributed to DSRC transmissions. Upon determining that the multi-mode device is located outside of the geographical region, at least a portion of the DSRC spectrum is used for transmissions by the multi-mode device.

40 Claims, 11 Drawing Sheets

(51) Int. Cl.
  *G01S 19/11* (2010.01)
  *G01S 19/48* (2010.01)
  *G01S 5/02* (2010.01)
  *H04W 72/00* (2009.01)

(56) References Cited

U.S. PATENT DOCUMENTS

2009/0213780 A1    8/2009  Dankberg
2010/0015971 A1    1/2010  Good et al.
2010/0093405 A1*   4/2010  Ewell et al. .................. 455/566
2010/0302948 A1*  12/2010  Sawai et al. .................. 370/241
2012/0120883 A1*   5/2012  Chen et al. ................... 370/329

OTHER PUBLICATIONS

Fernandes P., et al., "Platooning With DSRC-Based IVC-Enabled Autonomous Vehicles: Adding Infrared Communications for IVC Reliability Improvement," Intelligent Vehicles Symposium, IEEE, 2012, pp. 517-522.
ISA/EPO, Second Written Opinion of the International Preliminary Examining Authority, Int'l. App. No. PCT/US2014/035646, Apr. 16, 2015, European Patent Office, Munich, DE, 10 pgs.

* cited by examiner

LOCATION BASED USE OF THE DSRC SPECTRUM

BACKGROUND

The following relates generally to wireless communication, and more specifically to yielding to dedicated short range communication (DSRC) operations based on location. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. The available bandwidth for transmissions affects the data rate and throughput of the transmissions. As the bandwidth increases, the data rate may also increase.

Multi-mode devices that communicate on cellular and Wi-Fi networks may desire to use an increased amount of bandwidth for their transmissions. The bandwidth allocated to devices operating in the DSRC spectrum is typically used for DSRC-related transmissions. If a multi-mode device expands its bandwidth using the DSRC spectrum, it may cause interference to these DSRC-related transmissions. Thus, techniques to minimize interference to DSRC-related transmissions are desired when the DSRC spectrum is shared with devices performing non-DSRC transmissions.

SUMMARY

Management of the use and sharing of a dedicated short range communications (DSRC) spectrum for wireless communications is described. Current location information for a multi-mode device may be used to determine whether the DSRC spectrum may be used for communications to/from the multi-mode device. The multi-mode device may be currently operating outside of the DSRC spectrum. In one example, the multi-mode device may determine whether it is currently located in a region that is attributed to DSRC transmissions. This may include a region that is near roads, bridges, airports, train tracks, highways, etc. If the multi-mode device is located in such a region, the device may determine not to use the DSRC spectrum for transmissions. The device may determine not to use the DSRC spectrum in these regions in order to avoid interfering with ongoing DSRC transmissions that are typically present in such areas. If, however, the device is located outside of these regions, the multi-mode device may determine to operate using at least a portion of the DSRC spectrum.

In one embodiment, a method for using location information to determine whether to use at least a portion of a dedicated short range communications (DSRC) spectrum is described. In one example, current location information of a multi-mode device may be determined. The multi-mode device may be operating outside of the DSRC spectrum. The current location information may be used to determine whether the multi-mode device is located outside of geographical region attributed to DSRC transmissions. Upon determining that the multi-mode device is located outside of the geographical region, at least a portion of the DSRC spectrum may be used.

In one configuration, a method for using location information to determine whether to use at least a portion of the DSRC spectrum is described. Current location information of a multi-mode device may be determined. The multi-mode device may operate outside of the DSRC spectrum. The current location information may be used to determine whether the multi-mode device is located outside of geographical region attributed to DSRC transmissions. Upon determining that the multi-mode device is located outside of the geographical region, at least a portion of the DSRC spectrum may be used.

The geographical region may include a predetermined distance from a road. Using the current location information to determine whether the multi-mode device is located outside of the geographical region may include comparing the current location information to one or more entries of a database. The entries of the database may include information relating to the geographical region. In one embodiment, the current location information may be transmitted to an access point (AP). An instruction may be received from the AP indicating whether use of at least a portion of the DSRC spectrum is allowed. The database may be locally stored at the multi-mode device. The database may be a localized database based on the current location information of the multi-mode device. In one configuration, cache of the multi-mode device may be updated with the one or more entries of the localized database. The entries of the database may include information relating to locations of one or more roads.

In one configuration, upon determining that the multi-mode device is located within the geographical region, the device may continue to operate outside of the DSRC spectrum. Upon determining that the multi-mode device enters the geographical region, the device may transition from operating within the DSRC spectrum to operating outside of the DSRC spectrum. Determining that the multi-mode device is located outside of the geographical region may include identifying positioning information of one or more objects to determine a current location of the multi-mode device. The current location may be relative to the positioning information of the one or more objects. Determining that the multi-mode device is located outside of the geographical region may include identifying direct positioning information of the multi-mode device to determine a current location of the multi-mode device.

An apparatus for using location information to determine whether to use at least a portion of the DSRC spectrum is also described. The apparatus may include means for determining current location information of a multi-mode device. The multi-mode device may be operating outside of the DSRC spectrum. The device may include means for using the current location information to determine whether the multi-mode device is located outside of geographical region attributed to DSRC transmissions. Upon determining that the multi-mode device is located outside of the geographical region, the device may include means for using at least a portion of the DSRC spectrum.

A multi-mode device configured to use location information to determine whether to use at least a portion of the DSRC spectrum is also described. The device may include a processor and memory in electronic communication with the processor. Instructions may be stored in the memory. The instructions may be executable by the processor to determine current location information of a multi-mode device. The multi-mode device may be operating outside of the DSRC spectrum. The instructions may also be executable by the processor to use the current location information to determine whether the multi-mode device is located outside of geographical region attributed to DSRC transmissions. Upon determining that the multi-mode device is located outside of the geographical region, the instructions may be executable by the processor to use at least a portion of the DSRC spectrum.

A computer program product to use location information to determine whether to use at least a portion of the DSRC spectrum is also described. The computer program product may include a non-transitory computer-readable medium storing instructions executable by a processor to determine current location information of a multi-mode device. The multi-mode device may be operating outside of the DSRC spectrum. The instructions may be executable by the processor to use the current location information to determine whether the multi-mode device is located outside of geographical region attributed to DSRC transmissions. Upon determining that the multi-mode device is located outside of the geographical region, the instructions may be executable by the processor to use at least a portion of the DSRC spectrum.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
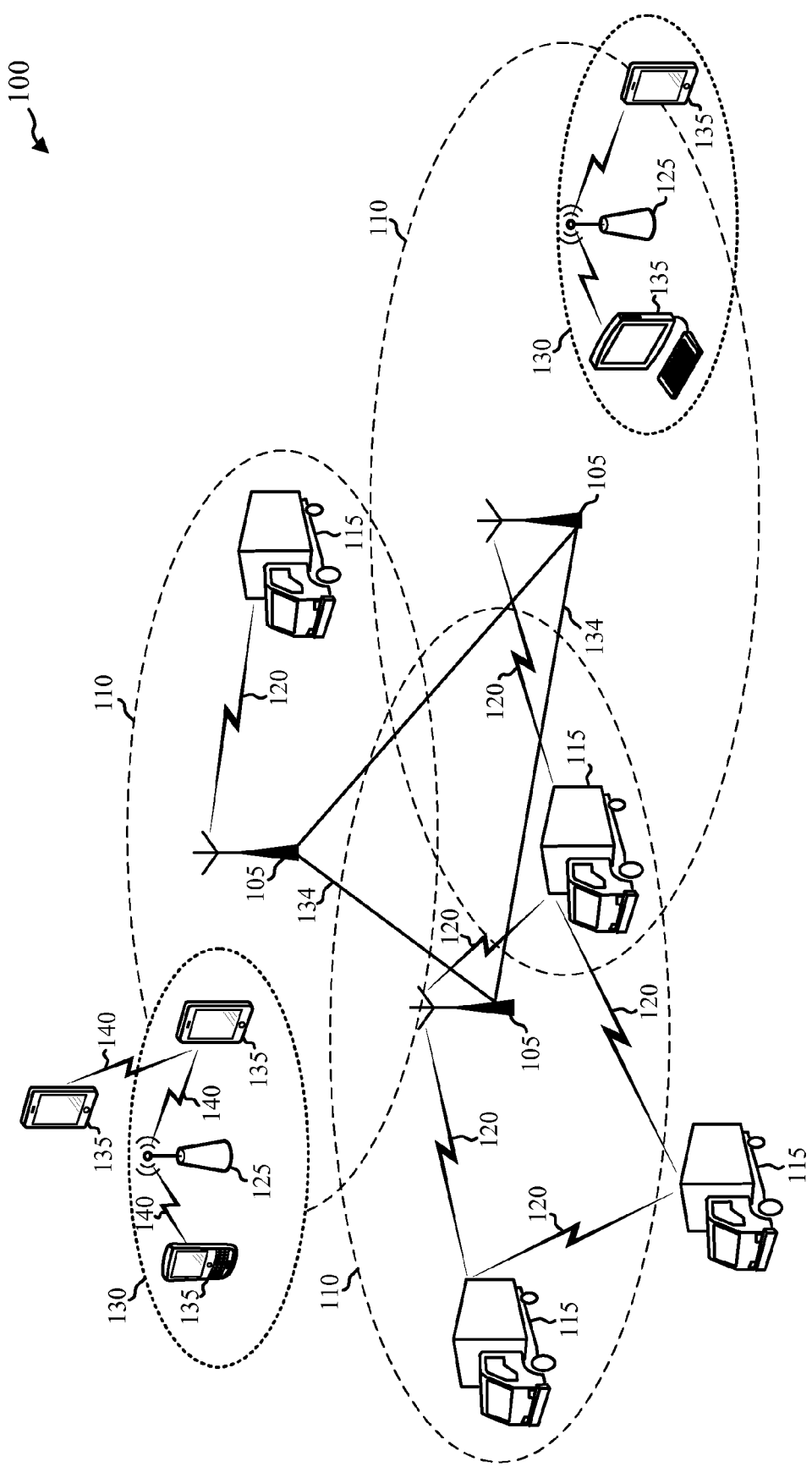
FIG. 1 shows a block diagram of a wireless communications system.

Information and data may be transferred more quickly and efficiently based on the amount of available bandwidth. The size of the bandwidth (e.g., the width) may be the difference between the highest frequency and the lowest frequency in a continuous range of frequencies (typically measured in Hertz, for example). Often, the data rate limit (e.g., channel capacity, amount of information that can be transferred) is proportional to the size of the bandwidth. For example, 80 MHz of bandwidth will have a higher data rate limit than 40 MHz of bandwidth. As a result, in order to support higher data rates, more bandwidth may be required. Bandwidth occupies at least a portion of a spectrum (e.g., radio spectrum). As a result, an increase in bandwidth requires an increase in spectrum. However, additional spectrum may be difficult to obtain.

In most cases, spectrum use is regulated (e.g., allocated). For example, in the United States, spectrum use is regulated by the Federal Communications Commission (FCC). In the United States, the FCC has allocated the 5.15-5.25 GHz (e.g., U-NII 1), 5.25-5.35 GHz (e.g., U-NII 2), 5.47-5.725 GHz (e.g., U-NII WW), and 5.725-5.825 GHz (e.g., U-NII 3) frequency bands as Unlicensed National Infrastructure (U-NII) spectrum and the 5.85-5.925 GHz frequency band as dedicated short range communication (DSRC) spectrum. Thus, bandwidth may be constrained to the space allotted in the allocated spectrum. As a result, it may not be possible to increase the available bandwidth (or the data rate limit, for example) due to the finite constraints of the allocated spectrum. As will be discussed below, spectrum sharing may be used to increase the available bandwidth.

In one example, the systems and methods described herein may enable multi-mode devices that operate in the U-NII spectrum band to opportunistic use the DSRC spectrum band to increase bandwidth. For instance, the systems and methods described herein may enable U-NII users (e.g., unlicensed Wi-Fi users) to use the DSRC spectrum based on their current location. In some configurations, the multi-mode devices may not operate in the DSRC spectrum if they are located near roads, highways, or other areas where DSRC devices operate in the DSRC spectrum. As used herein, a multi-mode device may be a Wi-Fi device capable of operating in the DSRC spectrum and outside of the DSRC spectrum. The multi-mode device may also be a device capable of operating in multiple networks, such as, but not limited to, a Wi-Fi network, a WLAN, a cellular network, etc. In one embodiment, the multi-mode device may not have cellular support and may be unable to communicate on a cellular network.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes DSRC base stations 105 and DSRC devices 115 operating within the DSRC spectrum (in a DSRC communications system, for example). The system 100 also includes access points 125 and multi-mode devices 135 operating outside of the DSRC spectrum. In one example, the access points 125 and the multi-mode devices 135 may operate in the U-NII spectrum (in a Wi-Fi communication system, for example).

The FCC initially allocated the DSRC spectrum for automotive use (e.g., intelligent transportation systems). Examples of DSRC communications include emergency warnings for vehicles, cooperative adaptive cruise control, cooperative collision warning, intersection collision avoidance, electronic parking payments, in vehicle signaling, electronic toll collection, etc. DSRC communication links 120 may exist between a DSRC device 115 and a DSRC base station 105 or between a DSRC device 115 and another DSRC device 115. In some cases, DSRC communication links 120 between DSRC devices 115 may occur outside of a coverage area 110 of the DSRC base station 105. In some embodiments, the DSRC base stations 105 may communicate, either directly or indirectly, with each other over backhaul links 134, which may be wired or wireless communication links.

The DSRC devices 115 are dispersed throughout the wireless communication system 100, and each DSRC device 115 may be stationary or mobile. A DSRC device 115 may be a vehicle, traffic signal, railroad crossing, base station, cellular phone, a personal digital assistant (PDA), or the like. A DSRC device 115 may be able to communicate with the DSRC base station 105 and other DSRC devices 115. Each DSRC base station 105 may provide communication coverage for a respective DSRC geographical area 110.

Multi-mode devices 135 may also be dispersed through the wireless communication system 100. Each device 135 may stationary or mobile. A device 135 may also be referred to by those skilled in the art as a Wi-Fi device, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A multi-mode device 135 may be a Wi-Fi device attempting to operate within the DSRC. The device 135 may also be a cellular phone, a personal digital assistant (PDA), a wireless modem, a wireless communication device, a handheld device, a tablet computer, a laptop computer, a cordless phone, a wireless local loop (WLL) station, or the like.

A multi-mode device 135 may be able to communicate with access points 125 and/or other multi-mode devices 135. Each of the access point 125 sites may provide communication coverage for a respective communications geographic area 130. Communication links 140 may provide communications between a device 135 and an access point 125 and/or a multi-mode device 135. In some embodiments, access points 125 may be referred to as a base transceiver station, a radio base station, a radio transceiver, a basic service set (BSS), an extended service set (ESS), a NodeB, eNodeB (eNB), Home NodeB, a Home eNodeB, or some other suitable terminology. The coverage area 130 for an access point 125 may be divided into sectors making up only a portion of the coverage area (not shown).

The communications system 100 may also support operation on multiple carriers (waveform signals of different frequencies). Multi-carrier transmitters can transmit modulated signals simultaneously on the multiple carriers. For example, each communication link 140 (and DSRC communication link 120, for example) may be a multi-carrier signal modulated according to the various radio technologies. Each modulated signal may be sent on a different carrier and may carry control information (e.g., reference signals, control channels, etc.), overhead information, data, etc.

As is shown in FIG. 1, the coverage area 130 of access points 125 may overlap with the coverage areas 110 of the DSRC base stations 105. In the typical scenario, the overlapping coverage areas (or overlapping use outside of one or more coverage areas, for example) may not result in interference because the DSRC communication system is operating in the DSRC spectrum while the other communications system is operating outside of the DSRC spectrum (in the U-NII spectrum, for example). However, in some embodiments, the systems and methods described herein describe techniques for sharing of the DSRC spectrum by the access point 125 and/or the multi-mode devices 135, which could result in interference for the DSRC communication system. In one example, a multi-mode communications device 135 may determine location information that indicates the current location of the device. The device 135 may begin to operate within the DSRC spectrum if it is located a certain distance away from areas that are attributed to DSRC transmissions, such as road, highways, airports, etc. In one embodiment, the current location information may be compared to one or more entries of a database. The entries of the database may include location information for roads, highways, and other areas where the DSRC spectrum is used for transmissions. Additionally or alternatively, the multi-mode communications device 135 may opportunistically use at least a portion of the DSRC spectrum based on the activity level of the DSRC devices 115 currently operating in the DSRC spectrum. Additionally or alternatively, the multi-mode communications device 135 may adapt an access timing parameter to provide priority to transmissions using the DSRC spectrum. Additionally or alternatively, the multi-mode communications device 135 may use a first clock rate while operating outside of the DSRC spectrum and may switch to a second clock rate to detect transmissions using the DSRC spectrum.

Figure 2:
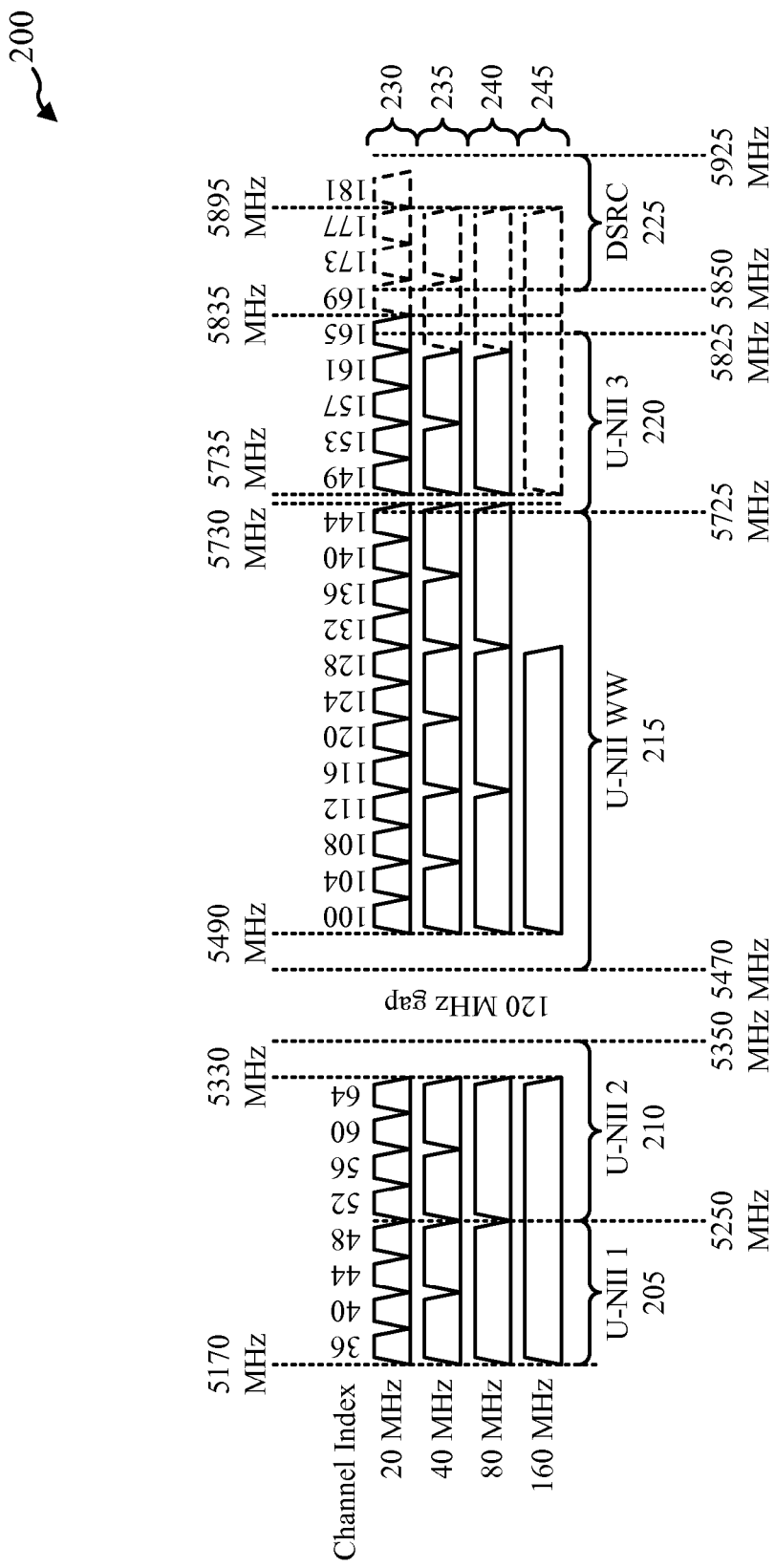
FIG. 2 is a diagram illustrating frequency band allocations along a frequency spectrum.

FIG. 2 shows an exemplary view of the various spectrum allocations in the 5 GHz spectrum 200. As illustrated in FIG. 2, the 5 GHz spectrum 200 includes the U-NII 1 frequency band 205 (e.g., 5170-5250 MHz), the U-NII 2 frequency band 210 (e.g., 5250-350 MHz), the U-NII WW frequency band 215 (e.g., 5470-5725 MHz), the U-NII 3 frequency band 220 (e.g., 5725-5825 MHz), and the DSRC frequency band 225 (e.g., 5850-5925 MHz).

Each frequency band may be allocated to use one or more channels. Each channel may occupy bandwidth (e.g., 10 MHz, 20 MHz, 40 MHz, 80 MHz, 160 MHz, etc.). As noted above, increased bandwidth may result in higher data rates. As a result, increasing the number of channels and/or increasing the bandwidth of the channels may be desirable. Unfortunately, spectrum allocations may limit the number and/or the size of channels. For example, the U-NII 1 frequency band 205 (which occupies 80 MHz, for example) may support up to four 20 MHz channels 230 (with channel indexes 36, 40, 44, and 48, for example), up to two 40 MHz channels 235, or one 80 MHz channel 240. Similarly, the U-NII 2 frequency band 210 may support up to four 20 MHz channels 230 (with channel indexes 52, 56, 60, and 64, for example), up to two 40 MHz channels 235, or one 80 MHz channel 240. As a result, neither the U-NII 1 frequency band 205 nor the U-NII 2 frequency band 210 by may individually support a 160 MHz channel 245. Certain devices (e.g., Wi-Fi device) may operate across both the U-NII 1 and U-NII 2 frequency bands 205, 210. As a result the U-NII 1 and U-NII 2 frequency bands 205, 210 may effectively be combined to result in a 5170-5350 MHz frequency band. Accordingly, a 160 MHz channel 245 (e.g., 5170-5330 MHz) may be supported.

As illustrated in FIG. 2, the U-NII 3 frequency band 220 (e.g., 5725-5825 MHz) may support up to five 20 MHz channels 230 (with channel indexes 149, 153, 157, 161, and 165, for example), up to two 40 MHz channels 235, or one 80 MHz channel 240. Typically, the DSRC frequency band 225 supports DSRC communications using 10 MHz channels. In some cases, the systems and methods described herein may opportunistically use the DSRC frequency band (as secondary users, for example). In one embodiment, multi-mode devices may use the DSRC spectrum when they are located in an area that is not attributed to DSRC transmissions. As a result, the U-NII 3 and DSRC frequency bands 220, 225 may effectively be combined to result in a 5725-5925 MHz frequency band. Accordingly, the combined frequency bands may support up to nine 20 MHz channels 230 (with channel indexes 149, 153, 157, 161, 165, 169, 173, 177, and 181, for example), up to four 40 MHz channels 235, up to two 80 MHz channels 240, and up to one 160 MHz channel 245. Thus, sharing of the DSRC spectrum may substantially increase the number of the available channels and/or the size of the available channels. In one example, spectrum sharing across the U-NII and DSRC frequency bands may support up to twenty nine 20 MHz channels 230, up to fourteen 40 MHz channels 235, up to seven 80 MHz channel 240, and up to three 160 MHz channels 245. These increases may enable increased data rates (allowing for higher throughput, for example). For instance, the increased data rates may be used to transmit high definition video formats (Ultra High Definition Television (UHDTV), for example).

Figure 3:
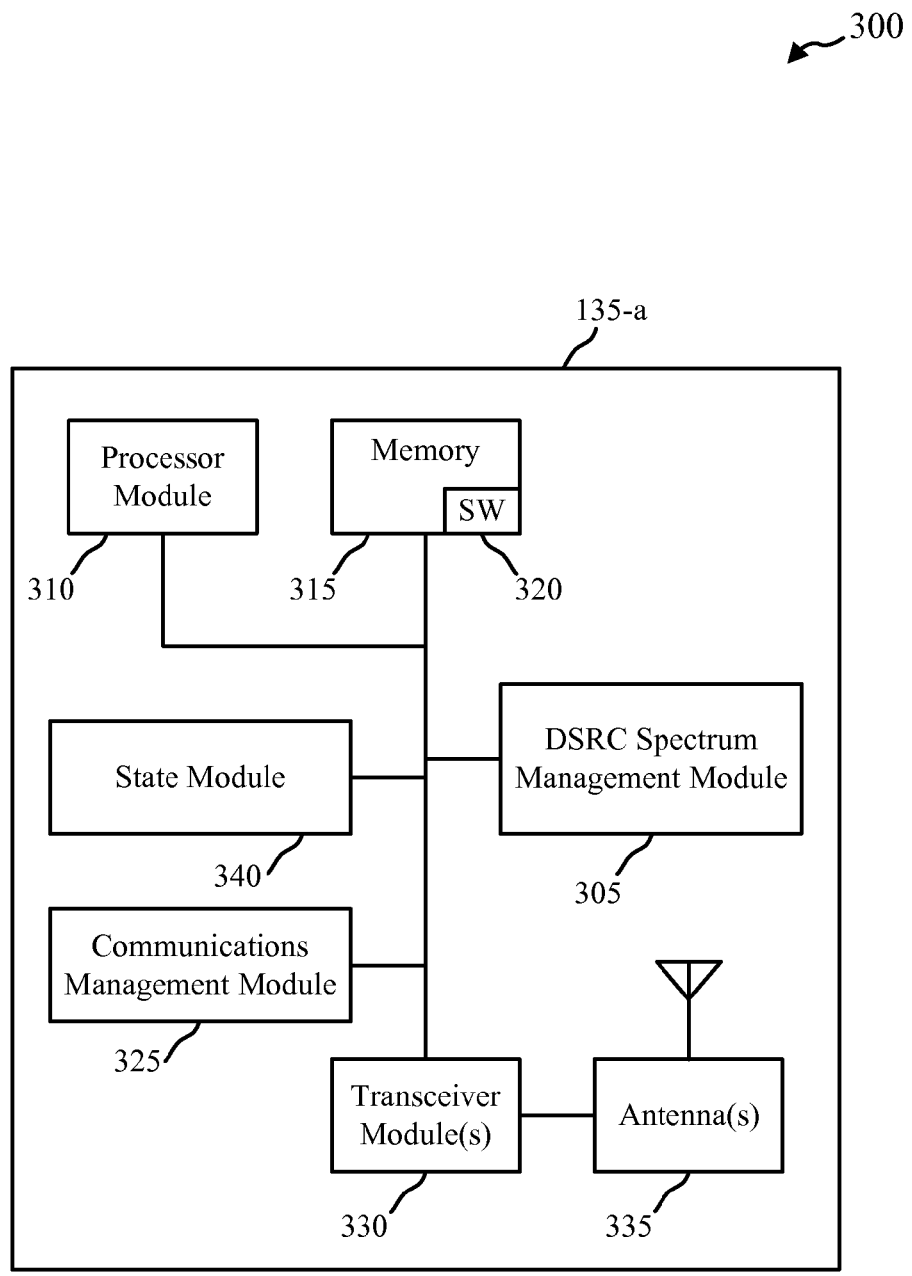
FIG. 3 shows a block diagram illustrating one example of a multi-mode device.

FIG. 3 is a block diagram 300 of a multi-mode device 135-*a*. This may be the multi-mode device 135 of FIG. 1. The device 135-*a* may have any of various configurations, such as a Wi-Fi device, personal computers (e.g., laptop computers, netbook computers, tablet computers, etc.), cellular telephones, PDAs, digital video recorders (DVRs), internet appliances, gaming consoles, e-readers, etc. The device 135-*a* may have an internal power supply (not shown), such as a small battery, to facilitate mobile operation.

The device 135-*a* includes antennas 335, a transceiver module 330, memory 315, and a processor module 310, which each may be in communication, directly or indirectly, with each other (e.g., via one or more buses). The transceiver module 330 is configured to communicate bi-directionally, via the antennas 335 and/or one or more wired or wireless links, with one or more networks, as described above. For example, the transceiver module 330 may be configured to communicate bi-directionally with access points 125 of FIG. 1. The transceiver module 330 may include a modem configured to modulate the packets and provide the modulated packets to the antennas 335 for transmission, and to demodulate packets received from the antennas 335. While the device 135-*a* may include a single antenna, the multi-mode device 135-*a* will typically include multiple antennas 335 for multiple links.

The memory 315 may include random access memory (RAM) and read-only memory (ROM). The memory 315 may store computer-readable, computer-executable software code 320 containing instructions that are configured to, when executed, cause the processor module 310 to perform various functions described herein (e.g., DSRC management, etc.). Alternatively, the software 320 may not be directly executable by the processor module 310 but be configured to cause the computer (e.g., when compiled and executed) to perform functions described herein.

The processor module 310 may include an intelligent hardware device, e.g., a central processing unit (CPU), a microcontroller, an application specific integrated circuit (ASIC), etc. The processor module 310 may include a speech encoder (not shown) configured to receive audio via a microphone, convert the audio into packets (e.g., 30 ms in length) representative of the received audio, provide the audio packets to the transceiver module 330, and provide indications of whether a user is speaking. Alternatively, an encoder may only provide packets to the transceiver module 330, with the provision or withholding/suppression of the packet itself providing the indication of whether a user is speaking.

According to the architecture of FIG. 3, the device 135-*a* further includes a communications management module 325 and a state module 340. The communications management module 325 may manage communications with other devices 135. By way of example, the communications management module 325 may be a component of the multi-mode device 135-*a* in communication with some or all of the other components of the multi-mode device 135-*a* via a bus. Alternatively, functionality of the communications management module 325 may be implemented as a component of the transceiver module 330, as a computer program product, and/or as one or more controller elements of the processor module 310. The state module 340 may reflect and control the current device state (e.g., context, authentication, base station association, other connectivity issues).

The device 135-*a* may further include a DSRC spectrum management module 305. The management module 305 may manage whether the device 135-*a* operates within the dedicated DSRC spectrum. The module 305 may make the determination to operate within the dedicated spectrum based on a number of factors. For example, the module 305 may allow operations within the spectrum based on the current activity level within the DSRC spectrum from other devices. The management module 305 may modify one or more parameters or operations of the device 135-*a* to detect the activity of devices operating in the DSRC spectrum. In addition, the decision to allow the device 135-*b* to operate within the spectrum may be based on the current location of the multi-mode device 135-*a*. While operating in the DSRC spectrum, the management module 305 may alter one or more communication parameters of the multi-mode device 135-*a*. These parameters may be altered to provide priority to communications originating from devices that are attributed to DSRC transmissions.

The components of the device 135-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 135-*a*.

Figure 4:
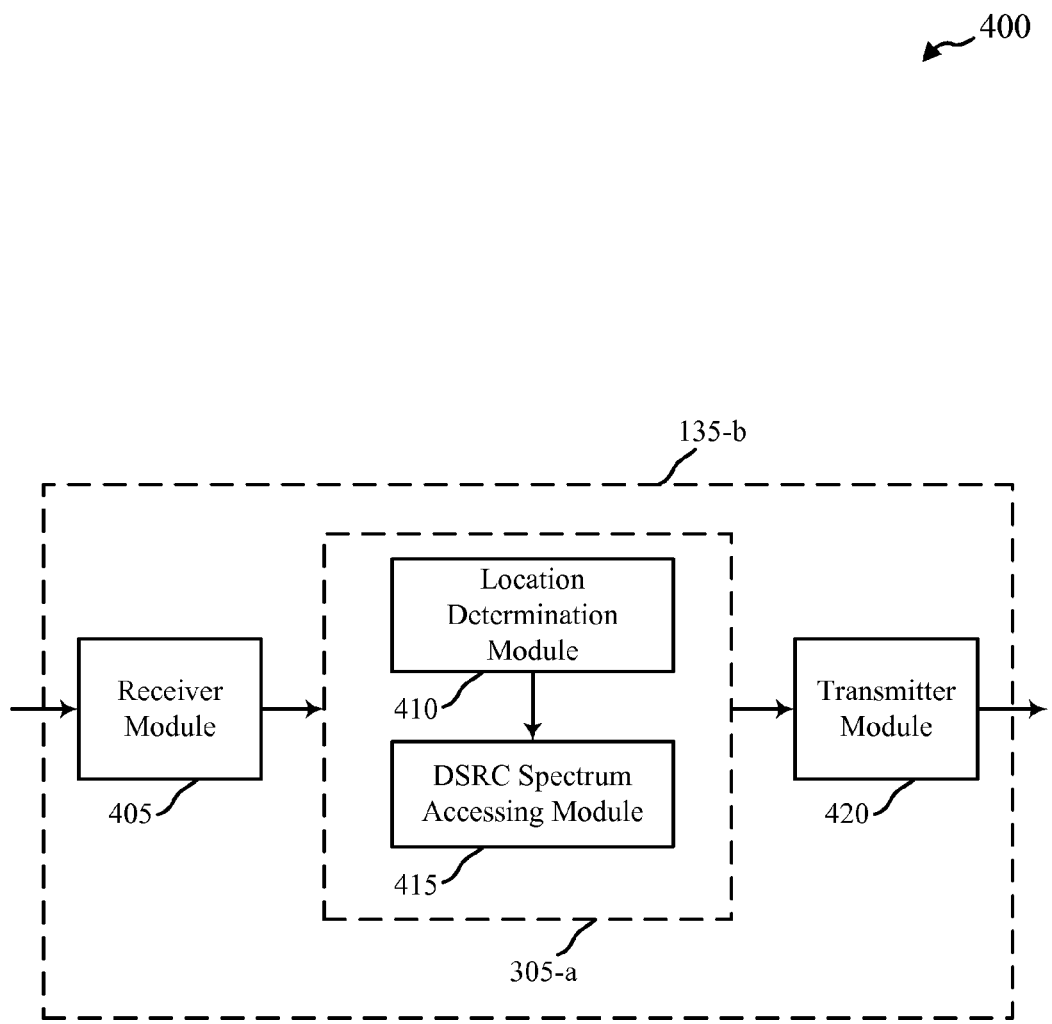
FIG. 4 shows a block diagram illustrating another example of the multi-mode device that may manage the use of the DSRC spectrum for communications.

FIG. 4 is a block diagram 400 illustrating an example of a multi-mode device 135-*b* that may be used to manage the use of the DSRC spectrum for communications. The device 135-*b* may be an example of one or more aspects of the multi-mode devices 135 described with reference to FIGS. 1 and/or 3. The device 135-*b* may include a receiver module 405, a DSRC spectrum management module 305-*a*, and a transmitter module 420. Each of these components may be in communication with each other.

The components of the multi-mode device 135-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 may be a Wi-Fi receiver and may receive various Wi-Fi signals. The receiver module 405 may be a cellular receiver, and in some cases may be an LTE/LTE-A receiver. The receiver module 405 may be used to receive various types of data and/or control signals over a wireless communications system, such as the wireless communication system 100 shown in FIG. 1. The data and/or control signals may include signals indicating the availability of resources for an uplink grant. The receiver module 405 may be configured to receive data and/or control signals using a portion of the DSRC spectrum.

The transmitter module 420 may also be a Wi-Fi transmitter capable of transmitting over a Wi-Fi connection. The transmitter 420 may be a cellular transmitter, and in some cases may be an LTE/LTE-A transmitter. The transmitter module 420 may be used to transmit various types of data and/or control signals over a wireless communications system such as the wireless communications system 100. The data and/or control signals may also be transmitted using a portion of the DSRC spectrum.

The DSRC spectrum management module 305-*a* may determine whether data and/or control signals may be received/transmitted using the DSRC spectrum. In one embodiment, the module 305-*a* may include a location determination module 410 and a DSRC spectrum accessing module 415. In one example, the location determination module 410 may determine the location information for the device 135-*b*. The location information may include the current location of the device 135-*b*. In one example, the location information may indicate the location of the device 135-*b* with respect to the location of another object. For example, the location determination module 410 may provide location information that indicates how far away the device 135-*b* is from a road, bridge, highway, etc. In one configuration, the DSRC spectrum accessing module 415 may access at least a portion of the DSRC spectrum based at least in part on the location information determined by the location determination module 410. In one embodiment, if the location determination module 410 determines the device 135-*b* is located within a certain distance of a road, highway, bridge, etc., the DSRC spectrum accessing module 415 may not access the DSRC spectrum and the device 135-*b* may continue to operate outside of the DSRC spectrum.

Figure 5:
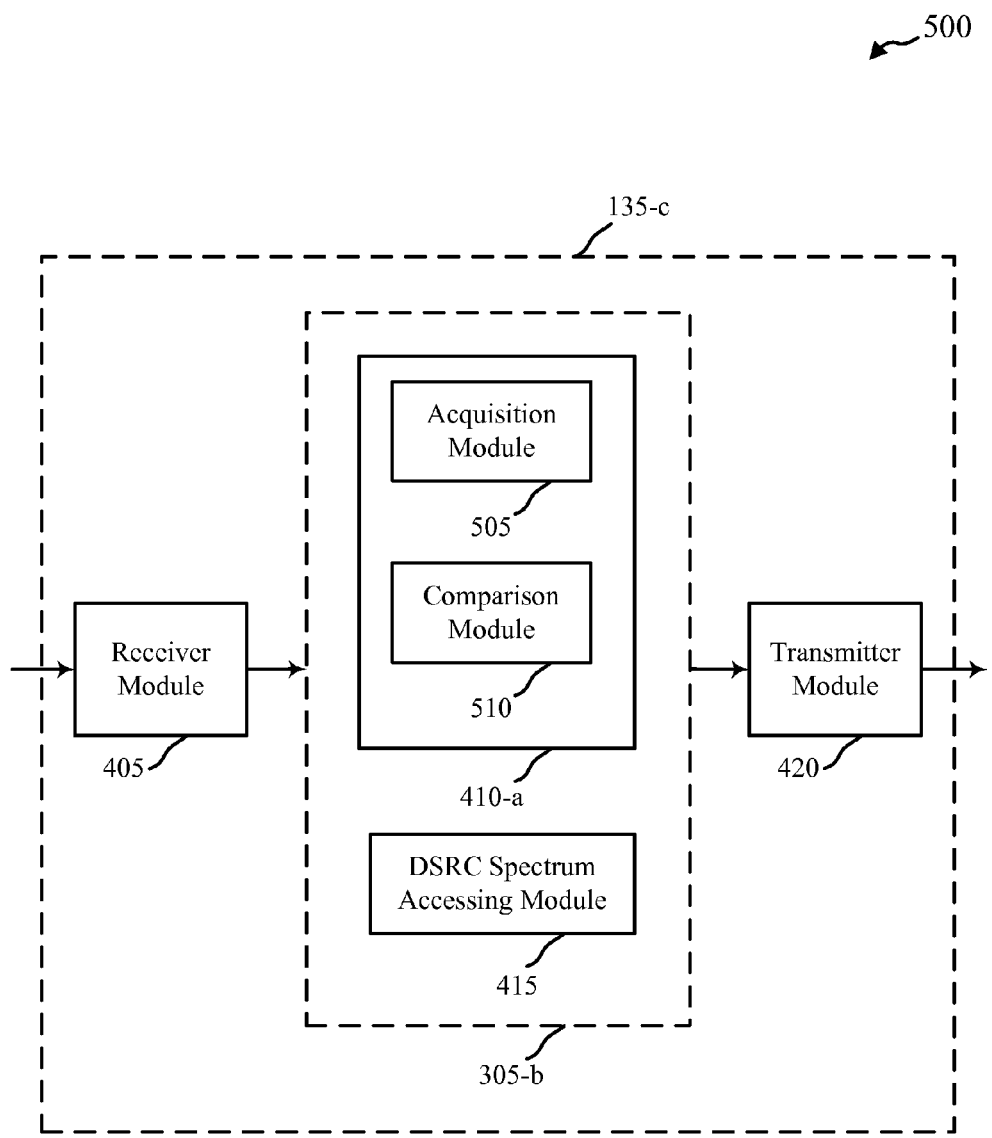
FIG. 5 is a block diagram illustrating an example of the multi-mode device that may operate using at least a portion of the DSRC spectrum.

FIG. 5 is a block diagram 500 illustrating an example of a multi-mode device 135-*c* that may operate using at least a portion of the DSRC spectrum. The device 135-*c* may be an example of one or more aspects of the multi-mode devices 135 described with reference to FIGS. 1, 3, and/or 4. The device 135-*c* may include a receiver module 405, a DSRC spectrum management module 305-*b*, and a transmitter module 420. Each of these components may be in communication with each other.

The components of the multi-mode device 135-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the receiver module 405 and the transmitter module 420 may be configured to operate as previously described above. The DSRC management module 305-*b* may include a location determination module 410-*a* and a DSRC spectrum accessing module 415. The location determination module 410-*a* may include an acquisition module 505 and a comparison module 510.

In one configuration, the acquisition module 505 may acquire location information for the multi-mode device 135-*c*. The location information may be acquired via global positioning system (GPS) technologies, indoor positioning techniques, ranging, and other location acquisition techniques. The acquisition module 505 may acquire the actual location of the device 135-*c* based on the GPS information. In addition, the acquisition module 505 may determine the location of the device 135-*c* with respect to another object. For example, the acquisition module 505 may acquire the location of a home, road, bridge, highway, airport, etc. from a database. The database may be a localized database stored in cache that is updated as the multi-mode device 135-*c* moves to a different location. The database may be a static database for one or more specific geographical regions. The static database may be stored in memory of the device 135-*c*. The database may be a dynamic database that is received from a back-end server across a network (such as a cellular or Wi-Fi network). The back-end server may send the device 135-*c* updates and modifications to the database. The device 135-*c* may store the dynamic database locally or the database may be stored at the back-end server. If the database is stored remotely on the back-end server, the acquisition module 505 may communicate with the back-end server to retrieve information from the remote database. Base stations and access points, such as those described in FIG. 1, may be used to communicate the information stored in a location database between the multi-mode device 135-c and the back-end server.

In one embodiment, the comparison module 510 may analyze the location information acquired by the acquisition module 505. The module 510 may compare the acquired location information with information stored in a location database. Based on the results of the comparison, the DSRC spectrum accessing module 415 may access at least a portion of the DSRC spectrum to use for communications of the device 135-c. In one example, the location information may indicate that the device 135-c is located in a certain geographical region. The comparison module 510 may access the location database to determine whether this geographical region is attributed to DSRC transmissions. For example, the comparison module 510 may determine whether roads, highways, airports, bridges, etc. are located in the geographical region. If the comparison module 510 determines that roads, highways, etc. are located within the geographical region, the DSRC spectrum accessing module 415 may not access the DSRC spectrum, and the multi-mode device 135-c may continue to operate outside of this spectrum.

In one configuration, if the location information indicates that the device 135-c is in a region where roads, highways, etc. are present, the comparison module 510 may access the database to determine the actual location of the road or highway. Using the location of the road or highway, the comparison module 510 may determine the actual or estimated distance of the device 135-c from the road or highway. If the distance is greater than a predetermined threshold, the DSRC spectrum accessing module 415 may access the DSRC spectrum. If, however, the distance between the location of the device 135-c and the location or the road is not greater than the threshold, the device 135-c may continue to perform communications outside of the DSRC spectrum.

The comparison module 510 may determine whether the location information acquired by the acquisition module 505 indicates that the device 135-c is located in an area that is not typically attributed with DSRC transmissions. For example, the location information may indicate that the device 135-c is located in an area classified as "home", "work", etc. Upon determining that the device 135-c is located in an area that not commonly associated with DSRC transmissions, the DSRC spectrum accessing module 415 may access at least a portion of the DSRC spectrum, and the multi-mode device 135-c may operate using this portion of the DSRC spectrum.

In one embodiment, as the multi-mode device 135-c moves to a different location, the acquisition module 505 may continue to acquire location information for the device 135-c and the comparison module 510 may determine whether the device 135-c has entered an area attributed to DSRC transmissions. For example, the device 135-c may originally be in a location that is not typically used for DSRC transmissions (e.g., in a home, work building, etc.). As a result, the DSRC spectrum accessing module 415 may access the DSRC spectrum and the device 135-c may operate using at least a portion of the spectrum. The device 135-c, however, may move to a geographical region that is attributed with DSRC transmissions. For instance, the device 135-c may move to an area near a road, highway, etc. As a result, the DSRC spectrum accessing module 415 may discontinue the access of the DSRC spectrum, and the device 135-c may return to operating outside of the DSRC spectrum.

While FIG. 5 illustrates the comparison function being performed by the multi-mode device 135-c, it is to be understood that the comparison process may be performed on a device separate from the multi-mode device 135-c. For example, as will be described below, the device 135-c may transmit location information to an access point, back-end server, base station, etc. and these devices may compare the location information with a database to determine whether the multi-mode device 135-c is located in a geographical region attributed to DSRC transmissions. The remote device transmit back an instruction to the multi-mode device 135-c indicating that the device 135-c is (or is not) allowed to operate in the DSRC spectrum.

Figure 6:
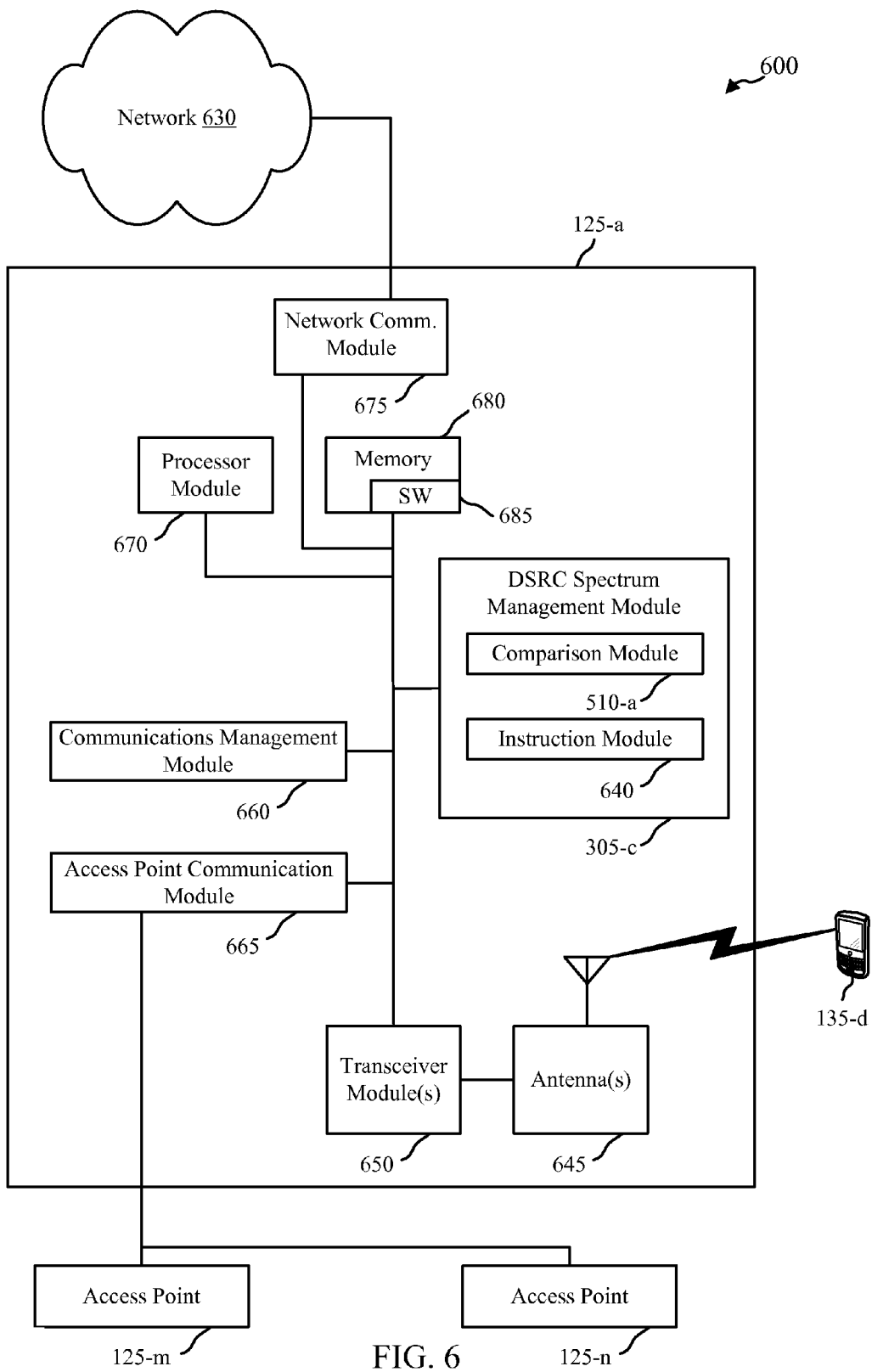
FIG. 6 shows a block diagram of a communications system that may be configured for managing the use of the DSRC spectrum.

FIG. 6 shows a block diagram of a communications system 600 that may be configured for managing the use of the DSRC spectrum by a multi-mode device 135. This system 600 may be an example of aspects of the system 100 depicted in FIG. 1, and/or access point 125 of FIG. 1. System 600 may include an access point 125-a. The access point 125-a may include antenna(s) 645, a transceiver module 650, memory 680, and a processor module 670, which each may be in communication, directly or indirectly, with each other (e.g., over one or more buses). The transceiver module 650 may be configured to communicate bi-directionally, via the antenna(s) 645, with the multi-mode device 135-d. The multi-mode device 135-d may be an example of the device 135 of FIGS. 1, 3, 4, and/or 5. The transceiver module 650 (and/or other components of the access point 125-a) may also be configured to communicate bi-directionally with one or more networks 630. In some cases, the access point 125-a may communicate with the core network 630 through network communications module 675. Access point 125-a may be an example of a Wi-Fi access point, an eNodeB base station, a Home eNodeB base station, a NodeB base station, and/or a Home NodeB base station.

Access point 125-a may also communicate with other access points 125, such as access point 125-m and access point 125-n. Each of the access points 125 may communicate with multi-mode device 135-d using different wireless communications technologies, such as different Radio Access Technologies. In some cases, access point 125-a may communicate with other access points such as 125-m and/or 125-n utilizing access point communication module 665. In some embodiments, access point communication module 665 may provide an interface within a wireless communication technology to provide communication between some of the access points 125. In some embodiments, access point 125-a may communicate with other access points through the core network 630.

The memory 680 may include random access memory (RAM) and read-only memory (ROM). The memory 680 may also store computer-readable, computer-executable software code 685 containing instructions that are configured to, when executed, cause the processor module 670 to perform various functions described herein (e.g., DSRC spectrum management). Alternatively, the software code 685 may not be directly executable by the processor module 670 but be configured to cause the computer, e.g., when compiled and executed, to perform functions described herein.

The processor module 670 may include an intelligent hardware device, e.g., a central processing unit (CPU), a microcontroller, an application-specific integrated circuit (ASIC), etc. The transceiver module 650 may include a modem configured to modulate the packets and provide the modulated packets to the antenna(s) 645 for transmission, and to demodulate packets received from the antenna(s) 645.

According to the architecture of FIG. 6, the access point 125-a may further include a communications management module 660. The communications management module 660 may manage communications with other access points 125. By way of example, the communications management module 660 may be a component of the access point 125-*a* in communication with some or all of the other components of the access point 125-*a* via a bus. Alternatively, functionality of the communications management module 660 may be implemented as a component of the transceiver module 650, as a computer program product, and/or as one or more controller elements of the processor module 670.

In one example, the access point 125-*a* may include a DSRC spectrum management module 305-*c*. The management module 305-*c* may include a comparison module 510-*a* and an instruction module 640. In one embodiment, the access point 125-*a* may receive location information from one or more multi-mode devices 135-*d*. The comparison module 510-*a* may compare the received location information to a database. The database may include locations of roads, highways, bridges, airports, and other areas that are attributed to DSRC transmissions. The comparison module 510-*a* may determine whether the one or more devices 135-*d* are located in a geographical region typically attributed to DSRC transmissions. Based on the results of the comparison, the instruction module 640 may generate instructions to be transmitted to the one or more devices 135-*d*. The instructions may indicate whether or not the devices 135 are allowed to operated in DSRC spectrum.

In some embodiments, the transceiver module 650 in conjunction with antenna(s) 645, along with other possible components of access point 125-*a*, may transmit DSRC instructions to one or more multi-mode devices 135-*d*. As previously described, the instructions may indicate whether the devices 135-*d* are allowed to operate in the DSRC spectrum. The determination to allow the use of the DSRC spectrum may depend in part on the location information of the device 135-*d*. If the access point 125-*a* determines that the device 135-*d* is located in an area that is not attributed to DSRC transmissions, the instructions may indicate that the device 135-*d* is allowed to operate in at least a portion of the DSRC spectrum.

Figure 7:
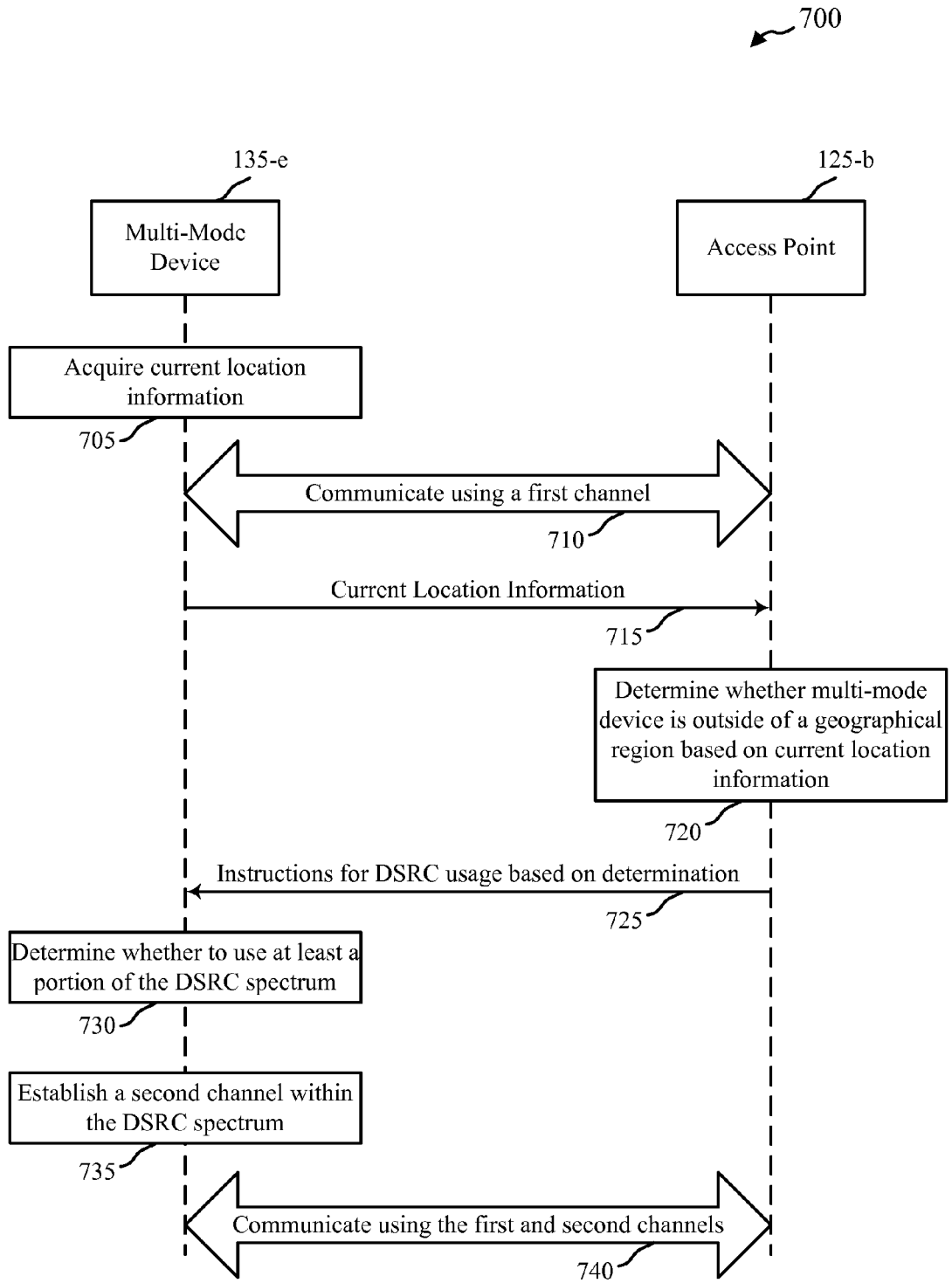
FIG. 7 is a message flow diagram illustrating one example of communications between a multi-mode device and an access point to manage the use of the DSRC spectrum.

FIG. 7 is a message flow diagram 700 illustrating one example of communications between a multi-mode device 135-*e* and an access point 125-*b*. The multi-mode device 135-*e* may be an example of the devices 135 of FIGS. 1, 3, 4, and/or 5. The access point 125-*b* may be an example of the access points 125 illustrated in FIGS. 1 and/or 6.

In one embodiment, the multi-mode device 135-*e* may acquire location information 705. The location information may indicate the current location of the device 135-*e*. The multi-mode device 135-*e* and the access point 125-*b* may communicate using a first channel 710. In one configuration, the first channel may be outside of the DSRC spectrum. The location information 715 may be transmitted to the access point 125-*b* using the first channel. In one configuration, the access point 125-*b* may analyze the location information to determine 720 whether the multi-mode device 135-*e* is outside of a particular geographical region. The particular geographical region may be a region attributed to DSRC transmissions. For example, the access point 125-*b* may determine whether the device 135-*e* is located a certain distance away from a road, highway, etc.

The access point 125-*b* may transmit instructions 725 relating to DSRC usage back to the multi-mode device 135-*e*. The instructions may be based on the determination as to whether the device 135-*e* was determined to be located outside of the geographical region. The instructions may also be sent using the first channel, which may be outside of the DSRC spectrum. In one configuration, the multi-mode device 135-*e* may use the instructions to determine 730 whether it is allowed to operate using at least a portion of the DSRC spectrum. If the instructions indicate that the device 135-*e* is allowed to operate within the DSRC spectrum, the device 135-*e* may establish 735 a second channel. The second channel may be within at least a portion of the DSRC spectrum. The multi-mode device 135-*e* and the access point 125-*b* may engage in communications 740 using the DSRC spectrum.

In one embodiment, the multi-mode device 135-*b* may analyze the location information to determine whether it is outside of a geographical region attributed to DSRC transmissions. As a result, the multi-mode device 135-*c* may not transmit location information to the access point 125-*b*. Instead, the device 135-*c* may determine for itself whether or not it should operate in the DSRC spectrum.

Figure 8:
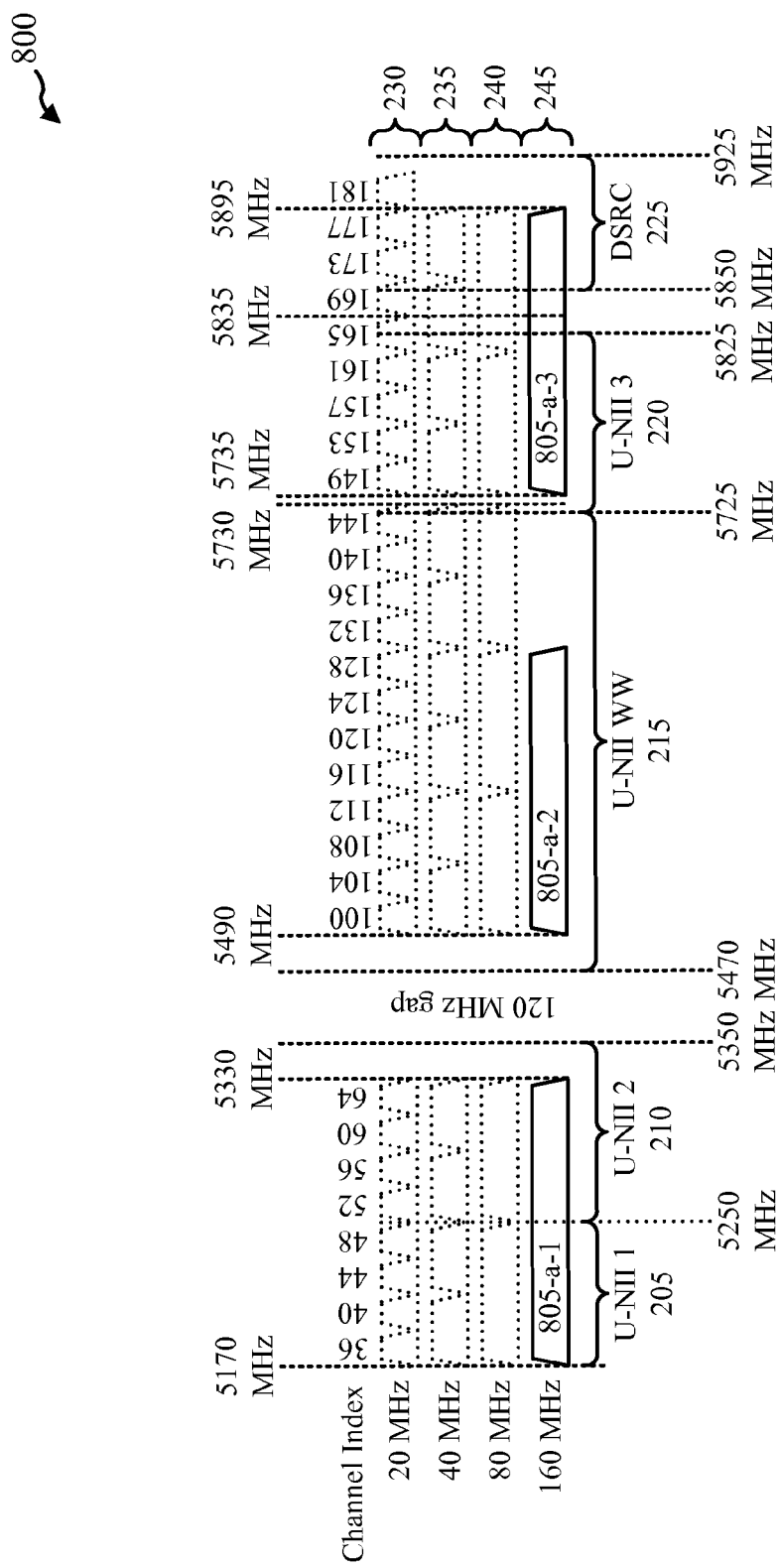
FIG. 8 is a diagram illustrating allocations bandwidth for various frequency bands along a frequency spectrum that may be used for communications.

FIG. 8 shows an exemplary view of various spectrum allocations in the 5 GHz spectrum 800 and the use of the DSRC spectrum by a multi-mode device 135. As previously described, the spectrum 800 may include different allocations of frequency bands along the spectrum 800. In one configuration, each frequency band allocation may use a certain number of frequency channels. Each channel may occupy a certain amount of bandwidth. As illustrated, the U-NII 1 frequency band 205 may support up to four 20 MHz channels 230, two 40 MHz channels 235, or one 80 MHz channel 240. Similarly, the U-NII 2 frequency band 210 may support up to four 20 MHz channels 230, two 40 MHz channels 235, or one 80 MHz channel 240. As previously stated, neither the U-NII 1 frequency band 205 nor the U-NII 2 frequency band 210 may individually support a 160 MHz channel 805-*a*-1. However, since a multi-mode device 135 may operate across both bands, 205, 210, the device may effectively use the 160 MHz channel across both frequency bands.

As further illustrated, the U-NII WW band 215 may support a 160 MHz channel 805-*a*-2. A 160 MHz channel 805-*a*-3 may also be supported across the bands for the U-NII 3 frequency band 220 and the DSRC frequency band 225. In one embodiment, when a multi-mode device 135 determines that it is located in an area where use of the DSRC spectrum is permitted, it may use at least a portion DSRC spectrum 225. As a result, the bandwidth for the transmissions of the device 135 may be increased as the device may operate on the 160 MHz channel 805-*a*-1 across the U-NII 1 205 and U-NII 2 210 bands, the 160 MHZ channel 805-*a*-2 in the U-NII WW band 215, as well as the 160 MHz channel 805-*a*-3 across the U-NII 3 spectrum 220 and the DSRC spectrum 225. This increase in bandwidth for the multi-mode device's 135 transmissions may enable increased data rates, which may allow for higher throuput.

Figure 9:
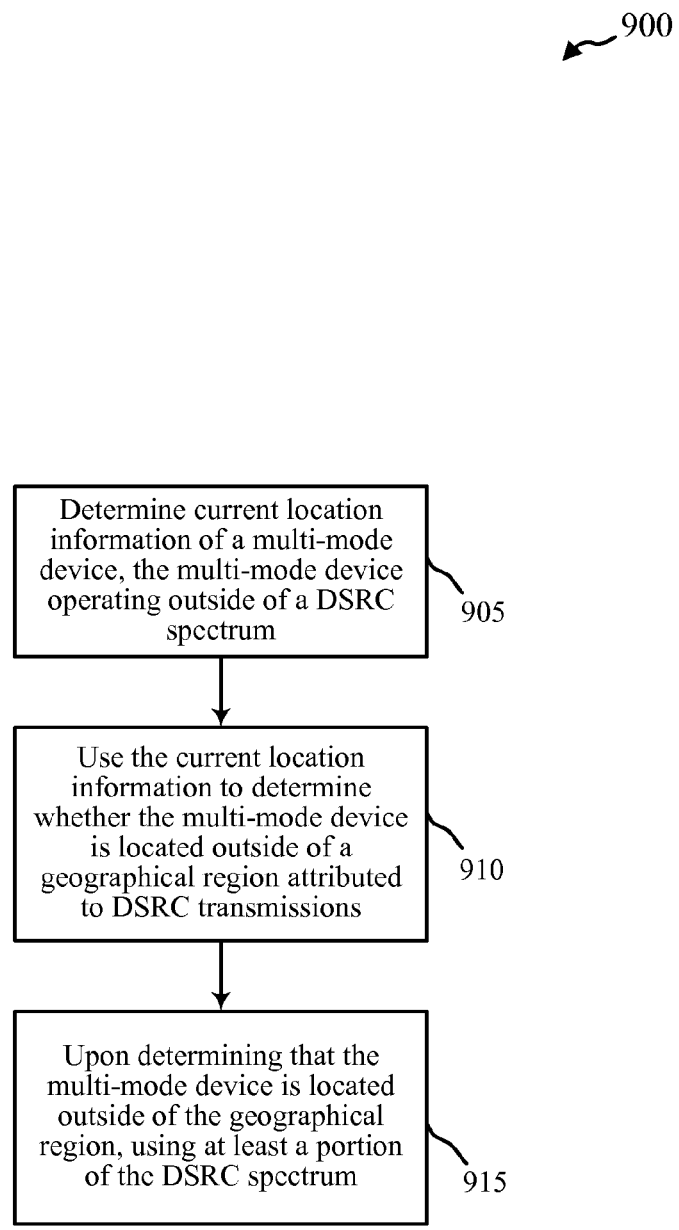
FIG. 9 is a flow chart illustrating one embodiment of a method for managing the use of the DSRC spectrum based on location information.

FIG. 9 is a flow chart illustrating one embodiment of a method 900 for managing the use of the DSRC spectrum based on location information. For clarity, the method 900 is described with reference to the multi-mode device 135 of FIGS. 1, 3, 4, 5, and/or 7. In one implementation, the DSRC management module 305 of FIGS. 3, 4, and/or 5 may execute one or more sets of codes to control the functional elements of the multi-mode device 135 to perform the functions described below.

At block 905, current location information of the multi-mode device 135 may be determined. In one configuration, the multi-mode device 135 may be currently operating outside of the DSRC spectrum. At block 910, the current location information may be used to determine whether the multi-mode device is located outside of a geographical region attributed to DSRC transmissions. For example, the current location information may be used to determine if the device 135 is within a certain distance from a road, highway, airport, or any other location that uses the DSRC spectrum. At block 915, upon determining that the multi-mode device 135 is located outside of the geographical region, at least a portion of the DSRC spectrum may be used by the device 135.

Therefore, the method 900 may provide for determining whether to operate within the DSRC spectrum based on the location of the multi-mode device 135. It should be noted that the method 900 is just one implementation and that the operations of the method 900 may be rearranged or otherwise modified such that other implementations are possible.

Figure 10:
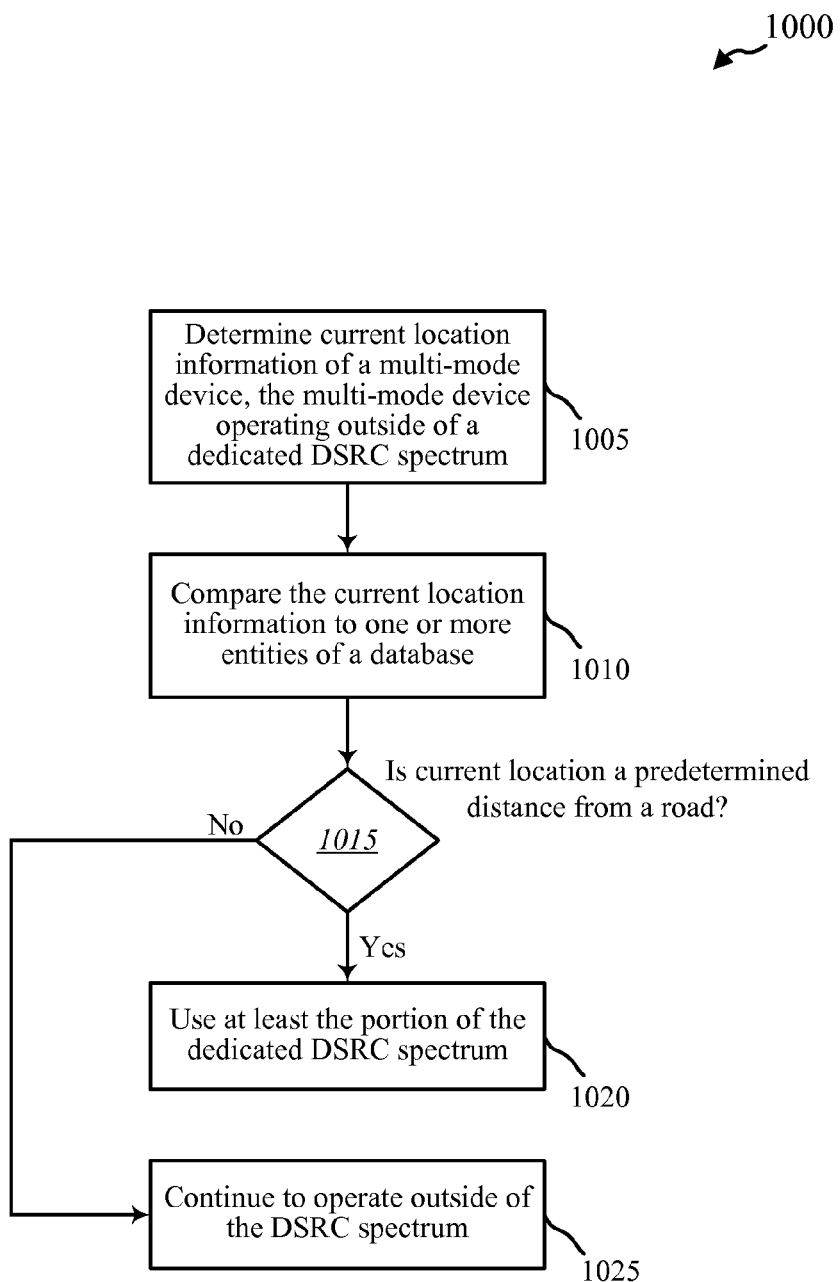
FIG. 10 is a flow chart illustrating a further embodiment of a method for managing the use of the DSRC spectrum based on location information.

FIG. 10 is a flow chart illustrating one embodiment of a method 1000 for managing the use of the DSRC spectrum based on location information. For clarity, the method 1000 is described with reference to the multi-mode device 135 of FIGS. 1, 3, 4, 5, and/or 7. In one implementation, the DSRC management module 305 of FIGS. 3, 4, and/or 5 may execute one or more sets of codes to control the functional elements of the multi-mode device 135 to perform the functions described below.

At block 1005, current location information for the device 135 may be determined. In one example, the device 135 may be operating outside of the DSRC spectrum. At block 1010, the current location information may be compared to one or more entries of a database. The one or more entries of the database may include the location of a road, highway, airport, or any other location that is attributed with DSRC transmissions. The database may be stored locally on the device 135. The database received from a back-end server via a network connection. In another embodiment, the database may be updated based on the location of the multi-mode device 135. For example, the device 135 may be located in a first area. The database may include entries indicating the location of roads in or near this first area. The device 135 may later move to a second area. The device 135 may access another database (or receive an updated database) that includes entries that indicate the location of roads in or near this second area.

At block 1015, a determination may be made as to whether the device 135 is a predetermined distance from a road. In one embodiment, the current location information may be compared to the entries of the database to determine whether the device 135 is within a certain distance from a road. If it is determined that the current location of the device 135 is farther than the predetermined distance from the road, at block 1020, the device 135 may begin to use at least a portion of the dedicated DSRC spectrum. If, however, it is determined that the device 135 is closer to the road than specified by the predetermined distance, the multi-mode device 135 may continue to operate outside of the DSRC spectrum.

Therefore, the method 1000 may provide for determining whether to operate within the DSRC spectrum based on the location of the multi-mode device 135. It should be noted that the method 1000 is just one implementation and that the operations of the method 1000 may be rearranged or otherwise modified such that other implementations are possible.

Figure 11:
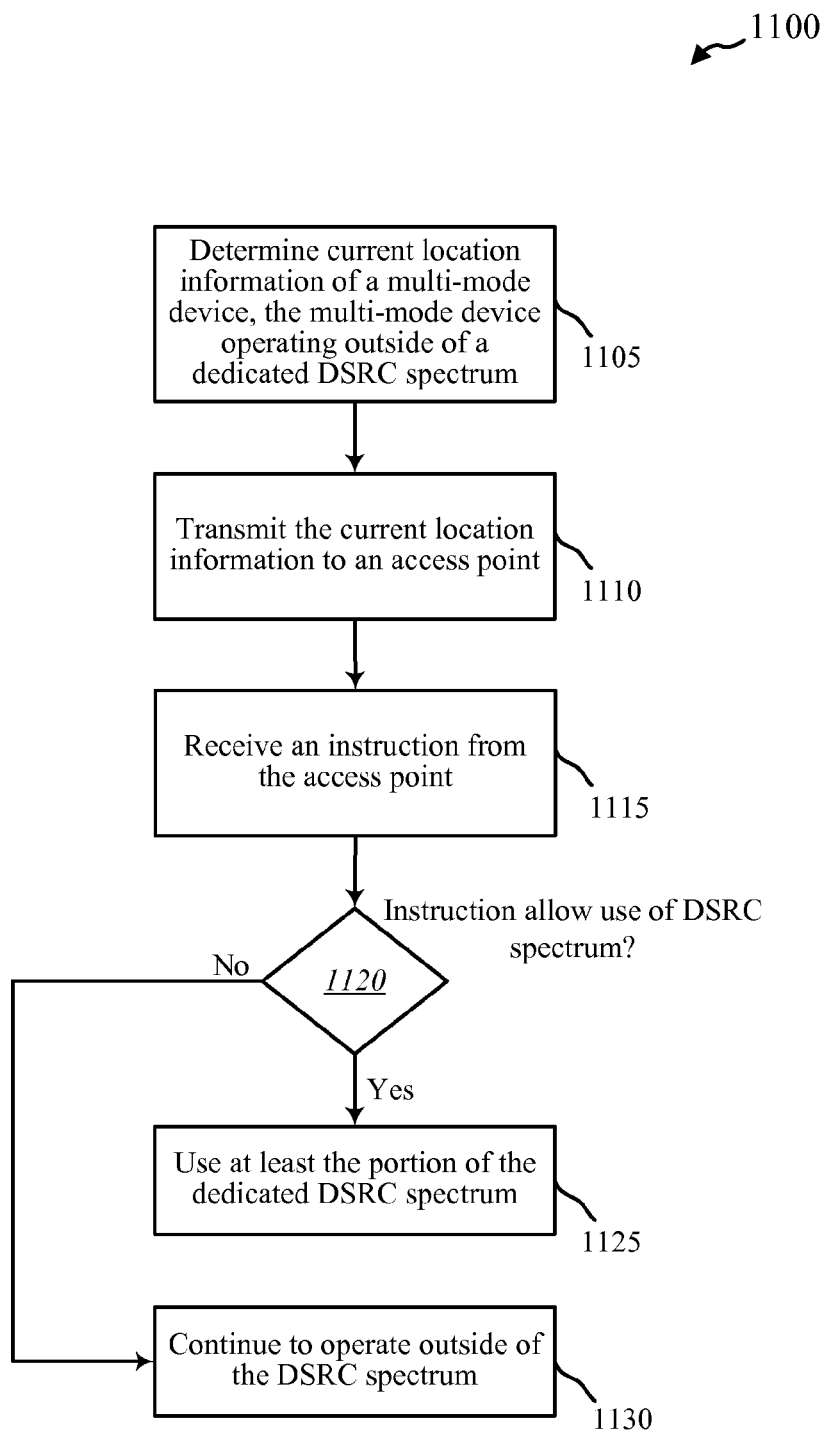
FIG. 11 is a flow chart illustrating another embodiment of a method for managing the use of the DSRC spectrum based on location information.

FIG. 11 is a flow chart illustrating one embodiment of a method 1100 for managing the use of the DSRC spectrum based on location information. For clarity, the method 1100 is described with reference to the multi-mode device 135 of FIGS. 1, 3, 4, 5, and/or 7. In one implementation, the DSRC management module 305 of FIGS. 3, 4, and/or 5 may execute one or more sets of codes to control the functional elements of the multi-mode device 135 to perform the functions described below.

At block 1105, current location information may be determined for a multi-mode device 135 that is operating outside of the DSRC spectrum. At block 1110, the current location information may be transmitted to an access point 125. The access point 125 may analyze the current location information to determine if the device 135 is located in an area that is attributed to DSRC transmissions (e.g., near a road, highway, etc.). At block 1115, the device 135 may receive an instruction from the access point 125. A determination 1120 may be made as to whether the instruction indicates the device 135 is allowed to operate within the DSRC spectrum. If the instructions indicates that the device may use the DSRC spectrum, at block 1125, the multi-mode device 135 may begin to use at least a portion of the dedicated DSRC spectrum. If, however, the instruction indicates that the device is not allowed to use the DSRC spectrum, the multi-mode device may continue to operate outside of the dedicated spectrum.

In one configuration, once the device 135 begins to operate in the DSRC spectrum, current location information may continue to be acquired for the device 135. The current location information may be continuously compared against entries of a database that includes the locations of roads, highways, and other areas that are attributed to DSRC transmissions. If it is determined that the device 135 is located in such an area, the use of the DSRC spectrum may terminate and the device 135 may proceed to operate outside of the dedicated spectrum.

Therefore, the method 1100 may provide for determining whether to operate within the DSRC spectrum based on the location of the multi-mode device 135. It should be noted that the method 1100 is just one implementation and that the operations of the method 1100 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for using location information to determine whether to use at least a portion of a dedicated short range communications (DSRC) spectrum, comprising:
    determining current location information of a multi-mode mobile device; using the current location information to determine whether the multi-mode mobile device is located outside of any geographical region allocated for use of DSRC spectrum for DSRC transmissions;
    upon determining that the multi-mode mobile device is located outside of any geographical region allocated for use of DSRC spectrum for DSRC transmissions, using at least a portion of the DSRC spectrum; and
    upon determining that the multi-mode device is not located outside of any geographical region allocated for use of DSRC spectrum for DSRC transmissions, continuing to perform communications outside of the DSRC spectrum via Unlicensed National Infrastructure (U-NII) spectrum;
    wherein any geographical region allocated for use of the DSRC spectrum for DSRC transmissions is within a predetermined distance from a road.

2. The method of claim 1, wherein any geographical region allocated for use of DSCR spectrum for DSRC transmissions comprises a geographical region a predetermined distance from a road.

3. The method of claim 1, wherein using the current location information to determine whether the multi-mode device is located outside of any geographical region allocated for use of DSCR spectrum for DSRC transmissions comprises:
    comparing the current location information to one or more entries of a database, the entries of the database comprising information relating to any geographical region allocated for use of DSCR spectrum for DSRC transmissions.

4. The method of claim 3, further comprising:
transmitting the current location information to an access point (AP); and
receiving an instruction from the AP indicating whether use of at least a portion of the DSRC spectrum is allowed.

5. The method of claim 3, wherein the database is locally stored at the multi-mode device.

6. The method of claim 3, wherein the database is a localized database based on the current location information of the multi-mode device.

7. The method of claim 6, further comprising:
updating cache of the multi-mode device with the one or more entries of the localized database.

8. The method of claim 3, wherein the entries of the database comprise information relating to locations of one or more roads.

9. The method of claim 1, further comprising:
upon determining that the multi-mode device is located within any geographical region allocated for use of DSCR spectrum for DSRC transmissions, continuing to operate outside of the DSRC spectrum.

10. The method of claim 1, further comprising:
upon determining that the multi-mode device enters any geographical region allocated for use of DSCR spectrum for DSRC transmissions, transitioning from operating within the DSRC spectrum to operating outside of the DSRC spectrum.

11. The method of claim 1, wherein determining that the multi-mode device is located outside of any geographical region allocated for use of DSCR spectrum for DSRC transmissions comprises:
identifying positioning information of one or more objects to determine a current location of the multi-mode device, the current location being relative to the positioning information of the one or more objects.

12. The method of claim 1, wherein determining that the multi-mode device is located outside of any geographical region allocated for use of DSCR spectrum for DSRC transmissions comprises:
identifying direct positioning information of the multi-mode device to determine a current location of the multi-mode device.

13. An apparatus for using location information to determine whether to use at least a portion of a dedicated short range communications (DSRC) spectrum, comprising:
means for determining current location information of a multi-mode mobile device;
means for using the current location information to determine whether the multi-mode mobile device is located outside of any geographical region allocated for use of DSRC spectrum for DSRC transmissions;
upon determining that the multi-mode mobile device is located outside of any geographical region allocated for use of DSRC spectrum for DSRC transmissions, means for using at least a portion of the DSRC spectrum; and
upon determining that the multi-mode device is not located outside of any geographical region allocated for use of DSRC spectrum for DSRC transmissions, means for continuing to perform communications outside of the DSRC spectrum via Unlicensed National Infrastructure (U-NII) spectrum;
wherein any geographical region allocated for use of DSRC spectrum for DSRC transmissions is within a predetermined distance from a road.

14. The apparatus of claim 13, wherein any geographical region allocated for use of DSCR spectrum for DSRC transmissions comprises a geographical region a predetermined distance from a road.

15. The apparatus of claim 13, wherein the means for using the current location information to determine whether the multi-mode device is located outside of any geographical region allocated for use of DSCR spectrum for DSRC transmissions comprises:
means for comparing the current location information to one or more entries of a database, the entries of the database comprising information relating to any geographical region allocated for use of DSCR spectrum for DSRC transmissions.

16. The apparatus of claim 15, further comprising:
means for transmitting the current location information to an access point (AP); and
means for receiving an instruction from the AP indicating whether use of at least a portion of the DSRC spectrum is allowed.

17. The apparatus of claim 15, wherein the database is locally stored at the multi-mode device.

18. The apparatus of claim 15, wherein the database is a localized database based on the current location information of the multi-mode device.

19. The apparatus of claim 18, further comprising:
means for updating cache of the multi-mode device with the one or more entries of the localized database.

20. The apparatus of claim 15, wherein the entries of the database comprise information relating to locations of one or more roads.

21. The apparatus of claim 13, further comprising:
upon determining that the multi-mode device is located within the geographical region, means for continuing to operate outside of the DSRC spectrum.

22. The apparatus of claim 13, further comprising:
upon determining that the multi-mode device enters any geographical region allocated for use of DSCR spectrum for DSRC transmissions, means for transitioning from operating within the DSRC spectrum to operating outside of the DSRC spectrum.

23. The apparatus of claim 13, wherein the means for determining that the multi-mode device is located outside of any geographical region allocated for use of DSCR spectrum for DSRC transmissions comprises:
identifying positioning information of one or more objects to determine a current location of the multi-mode device, the current location being relative to the positioning information of the one or more objects.

24. The apparatus of claim 13, wherein the means for determining that the multi-mode device is located outside of any geographical region allocated for use of DSCR spectrum for DSRC transmissions comprises:
identifying direct positioning information of the multi-mode device to determine a current location of the multi-mode device.

25. A multi-mode mobile device configured to use location information to determine whether to use at least a portion of a dedicated short range communications (DSRC) spectrum, comprising:
a processor;
memory in electronic communication with the processor; and instructions being stored in the memory, the instructions being executable by the processor to:
determine current location information of a multi-mode mobile device;
use the current location information to determine whether the multi-mode device is located outside of any geographical region allocated for use of DSRC spectrum for DSRC transmissions;
upon determining that the multi-mode mobile device is located outside of any geographical region allocated for use of DSRC spectrum for DSRC transmissions, use at least a portion of the DSRC spectrum; and
upon determining that the multi-mode device is not located outside of any geographical region allocated for use of DSRC spectrum for DSRC transmissions, continuing to perform communications outside of the DSRC spectrum via Unlicensed National Infrastructure (U-NII) spectrum;
wherein any geographical region allocated for use of DSRC spectrum for DSRC transmissions is within a predetermined distance from a road.

26. The multi-mode device of claim 25, wherein any geographical region allocated for use of DSCR spectrum for DSRC transmissions comprises a geographical region a predetermined distance from a road.

27. The multi-mode device of claim 25, wherein the instructions to use the current location information to determine whether the multi-mode device is located outside of any geographical region allocated for use of DSCR spectrum for DSRC transmissions are executable by the processor to:
compare the current location information to one or more entries of a database, the entries of the database comprising information relating to any geographical region allocated for use of DSCR spectrum for DSRC transmissions.

28. The multi-mode device of claim 27, wherein the instructions are executable by the processor to:
transmit the current location information to an access point (AP); and
receive an instruction from the AP indicating whether use of at least a portion of the DSRC spectrum is allowed.

29. The multi-mode device of claim 27, wherein the database is locally stored at the multi-mode device.

30. The multi-mode device of claim 27, wherein the database is a localized database based on the current location information of the multi-mode device.

31. The multi-mode device of claim 30, wherein the instructions are executable by the processor to:
update cache of the multi-mode device with the one or more entries of the localized database.

32. The multi-mode device of claim 27, wherein the entries of the database comprise information relating to locations of one or more roads.

33. The multi-mode device of claim 25, wherein instructions are executable by the processor to:
upon determining that the multi-mode device is located within any geographical region allocated for use of DSCR spectrum for DSRC transmissions, continue to operate outside of the DSRC spectrum.

34. The multi-mode device of claim 25, wherein the instructions are executable by the processor to:
upon determining that the multi-mode device enters any geographical region allocated for use of DSCR spectrum for DSRC transmissions, transition from operating within the DSRC spectrum to operating outside of the DSRC spectrum.

35. The multi-mode device of claim 25, wherein the instructions to determine that the multi-mode device is located outside of any geographical region allocated for use of DSCR spectrum for DSRC transmissions are executable by the processor to:
identify positioning information of one or more objects to determine a current location of the multi-mode device, the current location being relative to the positioning information of the one or more objects.

36. The multi-mode device of claim 25, wherein the instructions to determine that the multi-mode device is located outside of any geographical region allocated for use of DSCR spectrum for DSRC transmissions are executable by the processor to:
identify direct positioning information of the multi-mode device to determine a current location of the multi-mode device.

37. A computer program product to use location information to determine whether to use at least a portion of a dedicated short range communications (DSRC) spectrum, the computer program product comprising a non-transitory computer-readable medium storing instructions executable by a processor to:
determine current location information of a multi-mode mobile device; use the current location information to determine whether the multi-mode mobile device is located outside of any geographical region allocated for use of DSRC spectrum for DSRC transmissions;
upon determining that the multi-mode mobile device is located outside of any geographical region allocated for use of DSRC spectrum for DSRC transmissions, use at least a portion of the DSRC spectrum; and
upon determining that the multi-mode device is not located outside of any geographical region allocated for use of DSRC spectrum for DSRC transmissions, continuing to perform communications outside of the DSRC spectrum via Unlicensed National Infrastructure (U-NII) spectrum;
wherein any geographical region allocated for use of DSRC spectrum for DSRC transmissions is within a predetermined distance from a road.

38. The computer program product of claim 37, wherein any geographical region allocated for use of DSCR spectrum for DSRC transmissions comprises a predetermined distance from a road.

39. The computer program product of claim 37, wherein the instructions to use the current location information to determine whether the multi-mode device is located outside of any geographical region allocated for use of DSCR spectrum for DSRC transmissions are executable by the processor to:
compare the current location information to one or more entries of a database, the entries of the database comprising information relating to any geographical region allocated for use of DSCR spectrum for DSRC transmissions.

40. The computer program product of claim 39, wherein the instructions are executable by the processor to:
transmit the current location information to an access point (AP); and
receive an instruction from the AP indicating whether use of at least a portion of the DSRC spectrum is allowed.

* * * * *